(12) United States Patent
Alihodzic (10) Patent No.: US 7,703,677 B2
(45) Date of Patent: Apr. 27, 2010

(54) RECTIFIER CIRCUIT

(75) Inventor: Admir Alihodzic, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1441 days.

(21) Appl. No.: 11/083,334

(22) Filed: Mar. 17, 2005

(65) Prior Publication Data

US 2005/0205679 A1    Sep. 22, 2005

(30) Foreign Application Priority Data

Mar. 17, 2004   (DE)   ........................ 10 2004 013 177

(51) Int. Cl.
G06K 7/08    (2006.01)
G06K 19/06   (2006.01)

(52) U.S. Cl. ...................... 235/451; 235/492
(58) Field of Classification Search ................. 235/451, 235/492
See application file for complete search history.

(56) References Cited

U.S. PATENT DOCUMENTS 5,045,770 A    9/1991  Brooks
5,847,662 A *  12/1998 Yokota et al. ............ 340/10.34
6,134,130 A *  10/2000 Connell et al. ................ 363/89
6,343,022 B1 * 1/2002  Naruse ........................ 363/16
6,427,065 B1 * 7/2002  Suga et al. ................. 455/41.1
6,963,269 B2 * 11/2005 Saitoh et al. ............... 340/10.1
2003/0090917 A1* 5/2003 Chan et al. .................... 363/67
2004/0008013 A1  1/2004 Gay

FOREIGN PATENT DOCUMENTS

| EP | 1 089 217 A | 4/2001 |
|---|---|---|
| GB | 2 226 664 A | 7/1990 |
| JP | 10-210751 | 8/1998 |
| JP | 11-027870 | 1/1999 |
| JP | 2000-004189 | 1/2000 |
| WO | WO-01/06630 A1 | 1/2001 |

OTHER PUBLICATIONS

Finkenzeller, K.; "RFID Handbuch"; pp. 43-47, 78-81, and 99-101.
French Search Report issued May 23, 2006.
Japanese Office Action mailed Sep. 4, 2007.

* cited by examiner

*Primary Examiner*—Thien M. Le
*Assistant Examiner*—April A Taylor
(74) *Attorney, Agent, or Firm*—Dickstein, Shapiro, LLP.

(57) ABSTRACT

A data transmission method and a unit for performing data transmission. The method and unit include use of a data transmission interface having a controlled rectifier. The data transmission interface is actuated by a rectifier actuation unit.

16 Claims, 5 Drawing Sheets

RECTIFIER CIRCUIT

CROSS-REFERENCE TO RELATED APPLICATION

This application claims priority to German Patent Application Serial No. 10 2004 013 177.5, which was filed on Mar. 17, 2004, and is incorporated herein by reference in its entirety.

FIELD OF INVENTION

The invention relates to a data transmission unit having a data transmission interface in which the data transmission interface has a controlled rectifier, and a method for operating this data transmission unit.

BACKGROUND OF INVENTION

Contactless chip cards communicate with the reader without hard electrical connections. In this case, a distinction is drawn between passive chip cards and active chip cards. In the case of the "passive chip cards", the power required for communication and data processing needs to be provided externally. The power is frequently provided by the reader in the form of an electromagnetic field, i.e. the power is obtained from the received signal.

Figure 1:
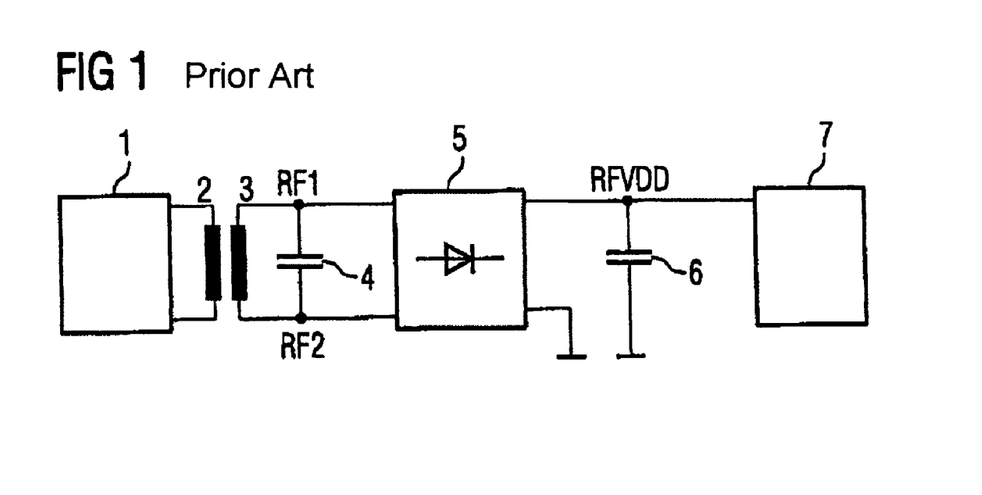
FIG. 1 shows a principle for supplying power to a contactless chip card which (principle) is known from the prior art.

FIG. 1 shows a principle which is known from the prior art for supplying power to a contactless chip card. The reader 1 uses the reader antenna 2 to generate an electromagnetic field. The electromagnetic coupling between the reader antenna 2 and the chip card antenna 3 is a coupled coil. The chip card antenna 3 has a resonance capacitor 4 connected in parallel with it whose capacitance is chosen such that, together with the coil inductance of the chip card antenna 3, a parallel resonance circuit is formed whose resonant frequency corresponds to the transmission frequency of the reader 1. A resonance rise in the parallel resonant circuit causes the induced voltage between RF1 and RF2 to reach a maximum. The induced voltage is rectified by a rectifier 5 and is smoothed by means of a smoothing capacitor 6, and is used to supply the chip 7 mounted on the chip card with the voltage RFVDD.

The voltage induced between RF1 and RF2 is highly dependent on the coupling factor of the reader antenna 2 and the chip card antenna 3. The coupling factor is determined by the distance between the chip card and the reader 1. At great distances, the coupling is weak, and only a low voltage is induced. At short distances, a resonance rise means that the induced voltage very quickly reaches high values which can damage the chip 7 as a result of overvoltage.

Figure 2:
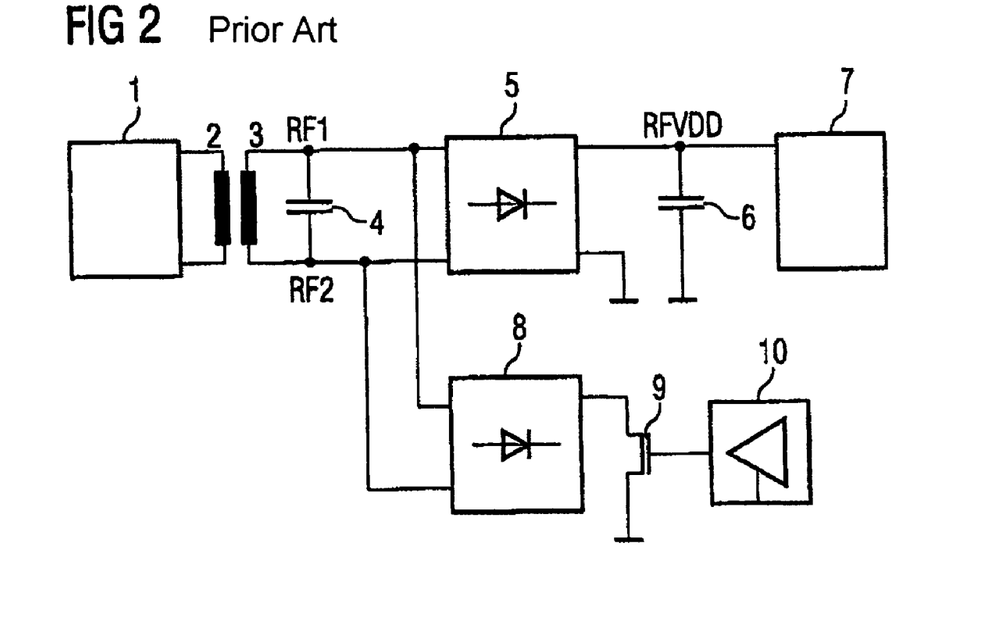
FIG. 2 shows a contactless chip card with a shunt element for protecting against overvoltages in accordance with the prior art.

FIG. 2 shows another solution which is known from the prior art and in which the chip is protected against overvoltage. In this case, the arrangement from FIG. 1 is extended by a shunt rectifier 8, having a shunt element 9 and a shunt element actuation unit 10, which is connected in parallel with the nodes RF1 and RF2. If the voltage induced between RF1 and RF2 is too high, the shunt element actuation unit 10 is used to actuate the shunt element 9 such that the output of the shunt rectifier 8 is shorted to ground. Some of the current induced in the chip card antenna 3 is thus discharged by the shunt element 9 and thus stabilizes the voltage RFVDD for supplying the chip 7. The use of the additional, parallel-connected shunt rectifier 8 reduces the voltage ripple in the supply voltage RFVDD (WO 01/06630 A1).

Figure 3:
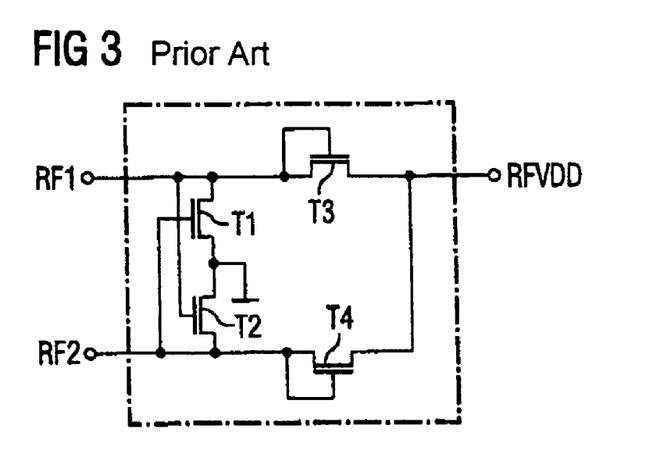
FIG. 3 shows a full-wave bridge rectifier based on the prior art.

FIG. 3 shows an embodiment of the rectifier 5 and shunt rectifier 8 which is known from the prior art. The connections RF1 and RF2 have an AC voltage applied to them. This voltage is rectified and is available as a DC voltage between RFVDD and ground. The rectifiers 5, 8 comprise four NMOS transistors T1 to T4 which are operated as diodes by connecting the gate connection to the source connection. The transistors T1 to T4 are connected up in the same way as the diodes in a full-wave bridge rectifier which is known from the prior art. In this case, two transistors from the four transistors are always on and two are always off.

For a positive half-cycle of the induced voltage, RF1 is greater than RF2. T3 and T2 are on, while T1 and T4 are off. The current flows from RF1 via T3 to RFVDD and through the load and via the ground and T2 back to RF2. For a negative half-cycle, RF2 is greater than RF1. T4 and T1 are on, while T3 and T2 are off. The current flows from RF2 via T4 to RFVDD and through the load and via the ground and T1 back to RF1. This interconnection means that the current always flows in the same direction through the load connected between RFVDD and ground, regardless of the polarity of the voltage which is present between RF1 and RF2.

Figure 4:
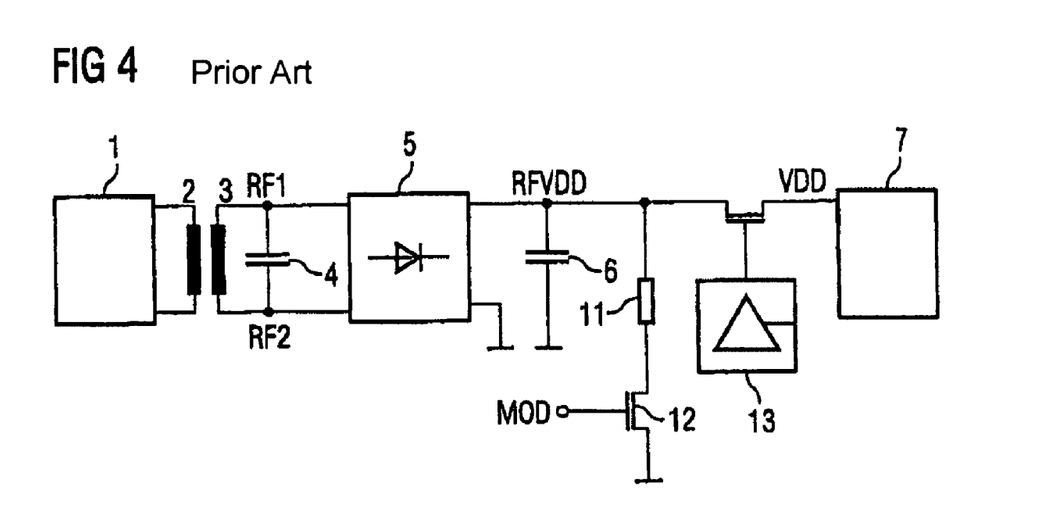
FIG. 4 shows the principle of load modulation with a modulator in the DC voltage portion of the power supply for a contactless chip card based on the prior art.

FIG. 4 illustrates the load modulation principle which is known from the prior art. Load modulation can be used to transmit data from the chip card to the reader 1. A modulator is connected between the smoothed voltage RFVDD and ground. The modulator comprises a modulation resistor 11 and a modulation element 12. In this example, the modulation element 12 is in the form of a transistor. As a result of the modulation element 12 being turned on and off by the signal MOD, the electrical load in the chip card and hence also the voltage on the chip card antenna 3 change. Since the chip card antenna 3 is connected to the reader antenna 2 by means of an electromagnetic field, load changes also affect the antenna voltage of the reader 1. The antenna voltage of the reader 1 is modulated by the changes in the electrical load in the removed chip card. In this case, the ratio of the amplitudes of the antenna voltage when the modulation element 12 is off and on is called the depth of modulation. When the data to be transmitted from the chip card to the reader are applied as signal MOD, they control when the modulation element 12 is turned on and off. The resultant changes in the antenna voltage in the reader 1 then correspond to the data which are to be transmitted and can be demodulated. This form of data transmission is called load modulation. FIG. 4 also shows a voltage regulator 13 with a transistor, which is intended to minimize voltage fluctuations in the supply voltage VDD for the chip 7 which arise as a result of the load modulation.

Figure 5:
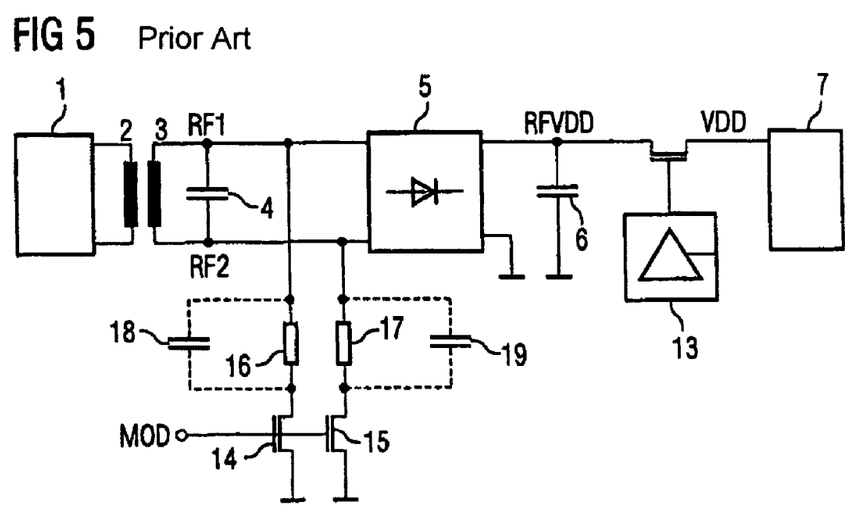
FIG. 5 shows the principle of load modulation with two modulators in the AC voltage portion of the power supply for a contactless chip card based on the prior art.

FIG. 5 shows a load modulation embodiment which is likewise known from the prior art. In this case, the modulator is not connected to the rectified voltage RFVDD, as in FIG. 4, but rather directly to the voltage between RF1 and RF2 which is provided by the chip card antenna. In the case of this embodiment, the modulator comprises two modulation resistors 16 and 17 and two modulation elements 14 and 15 which are respectively connected to ground in series between RF1 and RF2. The modulation elements are again in the form of transistors. This arrangement can be used to modulate both positive and negative half-cycles of the induced antenna voltage with the signal MOD. Besides lower circuit complexity, this arrangement has the additional advantage over FIG. 4 that the modulation's disturbances on the supply voltage RFVDD for the chip are smaller. In this case, the smoothing capacitor 6 is not discharged by the modulation process, since the rectifier 4 allows a flow of current in one direction only, namely in the one which charges the smoothing capacitor 6. In addition to the modulation resistors 16 and 17, it is also possible to use modulation capacitances 18 and 19 connected in parallel therewith. Besides the amplitude modulation, the voltage on the reader antenna is then additionally phase modulated.

In the case of the solution shown in FIG. 2 for protecting against overvoltages, it is a drawback that the shunt rectifier 8 produces an increased chip area requirement. The shunt element 9 itself, generally a transistor, also requires additional chip area, because it needs to be proportioned to be large enough to be able to dissipate excess power and convert it to heat. Since a large chip area has a direct effect on cost, the solution which is known from the prior art is unsatisfactory in this respect.

A drawback of the load modulation solutions known from the prior art which are shown in FIGS. 4 and 5 is that the level of the voltage RFVDD which is required for supplying the chip 7 is not taken into account during the modulation. If the chip card is at a great distance from the reader 1, only a low voltage is induced in the chip card antenna 3. In the case of additional load modulation of this voltage, the minimum supply voltage VDD for the chip 7 which is required may be undershot. In this case, breaks appear in the power supply for the chip 7, and communication with the reader 1 is then no longer possible. To bridge these breaks in supply, it would be possible to increase the size of the smoothing capacitor 6. A drawback of this, however, is the additional need for expensive chip area and, in an arrangement as shown in FIG. 4, the restriction in the modulation dynamics as a result of the smoothing capacitor 6.

Another drawback of the previously known apparatuses from FIG. 4 and FIG. 5 is that additional chip area is required for the modulation elements 12, 14 and 15 themselves. In this case, the modulation element needs to be provided with appropriately large proportions for its contact resistance to become as low as possible. Another inadequacy of the known circuits for load modulation is that the depth of modulation is not predictable.

SUMMARY

The invention is therefore based on an object of providing a data transmission unit having a data transmission interface which has a minimum area requirement, and a method for operating the data transmission unit.

The invention achieves this object by means of a data transmission unit having a data transmission interface which has a controlled rectifier which is actuated by a control unit, and by means of a method for operating the controlled rectifier, as a result of which additional components become unnecessary.

BRIEF DESCRIPTION OF THE DRAWINGS

The invention is explained in more detail below using exemplary embodiments with reference to the drawings.

DETAILED DESCRIPTION OF EXEMPLARY EMBODIMENTS OF THE INVENTION

In line with one development of the invention, the controlled rectifier is in a form such that it is actuated on the basis of a voltage which is available in the data transmission unit. This has the advantage that a feedback loop can be used to regulate the voltage across the controlled rectifier, which voltage is available in the data transmission unit.

In line with one preferred embodiment, the data transmission interface is of contactless design. This is a simple way of avoiding the wear- and dirt-related drawbacks of data transmission interfaces which use contact.

In line with one development, the rectifier is in the form of a full-wave bridge rectifier. One advantage of this is the lower voltage ripple in comparison with half-wave bridge rectifiers.

It is also advantageous that the controlled rectifier comprises two transistors connected up as diodes and two actuatable transistors. This means that the response of the rectifier can be influenced by the actuation of the transistors.

If the voltage which is available in the data transmission unit exceeds a prescribable value, one preferred variant embodiment involves the transistors being actuated such that the current flows through one transistor connected as a diode and through both actuatable transistors for a positive half-cycle of the input voltage for the rectifier and flows through the other transistor connected as a diode and through both actuatable transistors for a negative half-cycle. If, by contrast, the voltage which is available in the data transmission unit is below a prescribable value then the transistors are actuated such that the current flows through one transistor connected as a diode and through one actuatable transistor for a positive half-cycle of the input voltage for the rectifier and flows through the other transistor connected as a diode and through the other actuatable transistor for a negative half-cycle. One advantage of this is that the controlled rectifier performs the functions of rectifier and shunt element simultaneously, and the data transmission unit is both supplied with current and protected against overvoltages.

In one development of the invention, the actuatable transistors are advantageously actuated on the basis of the voltage which is present on the output of the controlled rectifier, since this allows the voltage generated by the controlled rectifier to be regulated.

The transistors in the controlled rectifier in the inventive apparatus are preferably designed using NMOS technology, since this technology has a higher level of mobility for the majority charge carriers than PMOS technology.

It is also advantageous to actuate the actuatable transistors in the controlled rectifier on the basis of the data which are to be transmitted by the data interface. Besides its function as a rectifier and a shunt element, the controlled rectifier can thus simultaneously perform the function of a modulation element as well without any additional chip area requirement.

In one variant refinement of the invention, the ratio of the voltages which are present on the input of the controlled rectifier in the case of the high and low states which are to be transmitted for the data is designed to be independent of the voltage which is present on the output of the controlled rectifier. In this way, the load modulation is regulated to a constant value independently of the voltage on the output of the controlled rectifier.

In a further embodiment of the invention, the ratio of the voltages which are present on the controlled rectifier in the case of the high and low states which are to be transmitted for the data is prescribable. One advantage of this case is that the depth of modulation can be set according to estimation.

Finally, the object is achieved by a method for operating a data transmission unit having a data transmission interface by virtue of the controlled rectifier being used as a rectifier, as a shunt element and as a modulation element simultaneously. The advantage of this method is that the clever use of a controlled rectifier allows a plurality of functions to be performed and thus reduces the necessary chip area for the data transmission unit to a considerable extent.

Figure 6:
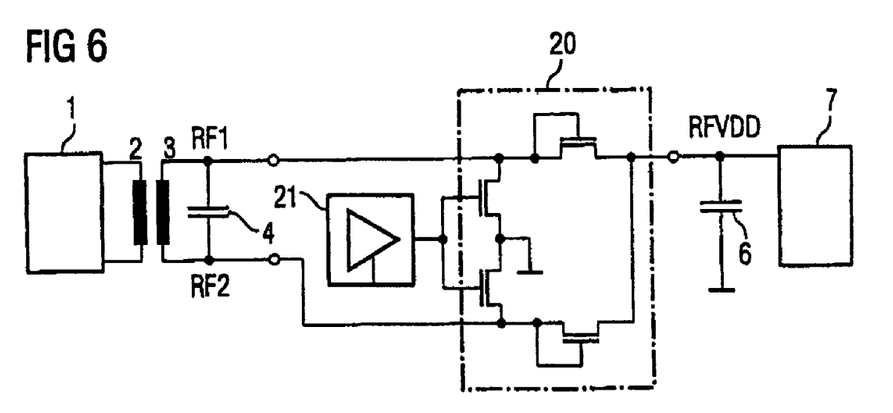
FIG. 6 shows the components for supplying power to a contactless chip card with an exemplary embodiment of a controlled rectifier based on the invention.

The apparatus shown in FIG. 6 is designed in the same way as the data transmission unit with a contactless data transmission interface which is known from FIG. 1 with the difference that the full-wave bridge rectifier 5 from FIG. 1 is replaced with a controlled rectifier 20 having a rectifier actuation unit 21. The actuation of the rectifier 20 determines its output voltage RFVDD. In this case, the rectifier is actuated 21 on the basis of a voltage which is present in the data transmission unit, for example the supply voltage RFVDD for the chip 7. Using known arrangements, for example comprising voltage divider, regulating amplifier and reference voltage, it is possible to regulate the output voltage RFVDD from the controlled rectifier 20 to a prescribable value using a feedback loop.

Figure 7:
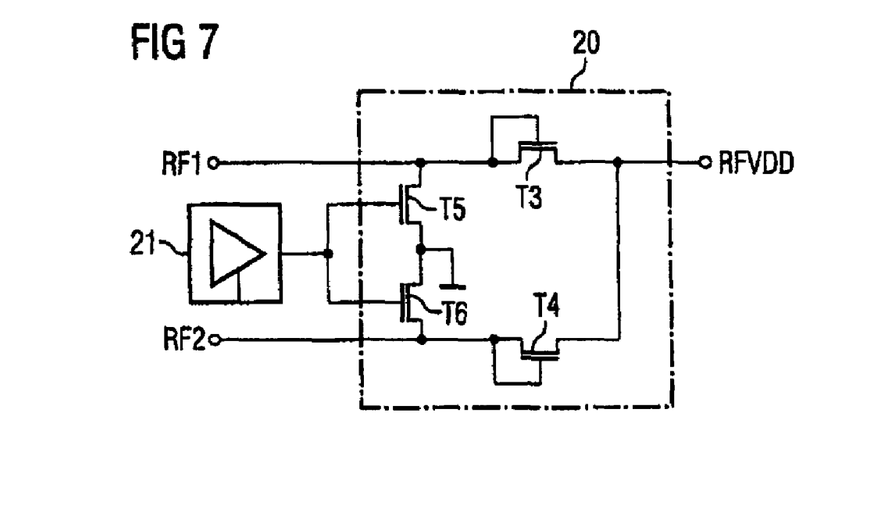
FIG. 7 shows an exemplary embodiment of an inventive controlled full-wave bridge rectifier with NMOS transistors.

In this case, the controlled rectifier 20 is of particular importance and is described with reference to FIG. 7. The arrangement of the transistors T3, T4, T5, T6 in the controlled rectifier 20 corresponds to that for the full-wave bridge rectifier in FIG. 3. In contrast to this known full-wave bridge rectifier, however, not all four transistors are connected up as diodes, but rather two, namely T3 and T4. The other two transistors, T5 and T6, are actuated by means of the rectifier actuation unit 21. In the present example, the transistors T5 and T6 are actuated together, but separate actuation is also possible. In this case, the transistors are preferably in the form of NMOS transistors; other embodiments and technologies with an equivalent function are known to those skilled in the art and may likewise be used with the necessary modifications. Depending on its actuation by the rectifier actuation unit 21, the controlled rectifier 20 performs only the function of a rectifier or else the functions of a rectifier and a shunt element simultaneously.

First, the simultaneous operation of the controlled rectifier 20 as a rectifier and a shunt element is considered. If the chip card is close to the reader 1 then the electromagnetic energy transmitted from the reader antenna 2 shown in FIG. 6 to the chip card antenna 3 is high. The voltage induced between RF1 and RF2 is correspondingly high and may exceed a maximum permissible value. When a prescribable value for a voltage which is available in the data transmission unit is exceeded, the value of the supply voltage RFVDD therefore needs to be reduced to an admissible value. To this end, the rectifier actuation unit 21 actuates the transistors T5 and T6 in FIG. 7 jointly such that both transistors are on at the same time. In the case of NMOS transistors, this is done by applying a positive gate voltage to T5 and T6.

Some of the induced current is discharged as a result via the transistors T5 and T6. The controlled rectifier 20 thus performs a shunt function, and the supply voltage RFVDD falls. To understand the operation of the controlled rectifier 20 better, positive and negative half-cycles of the voltage induced between RF1 and RF2 are now considered separately.

If a positive half-cycle of the induced voltage is applied, the voltage on RF1 is higher than that on RF2. The transistor T3 connected as a diode is on, while T4 is off. Some of the induced current flows from RF1 via T3, the chip load connected between RFVDD and ground, and via T6 back to RF2. Besides its shunt function, the controlled rectifier 20 also performs a rectifier function, with the transistor T6 carrying both the shunt current and the current which is required in order to supply the chip 7.

If a negative half-cycle of the induced voltage is applied, on the other hand, the voltage on RF2 is higher than that on RF1. The transistor T4 connected as a diode is on, while T3 is off. Some of the induced current flows from RF2 via T4, the chip load connected between RFVDD and ground, and via T5 back to RF1. The controlled rectifier again performs not only its shunt function but also a rectifier function, with the transistor T5 carrying both the shunt current and the current which is required in order to supply the chip. If the voltage induced in the chip card is too high, the controlled rectifier is used as a rectifier and a shunt element simultaneously. The advantage over the prior art in FIG. 2 is that there is no need for a separate shunt rectifier 8 with additional shunt element 9. The design of the data transmission unit is simplified for the same functionality, and the required chip area is reduced.

Now that the simultaneous operation of the controlled rectifier 20 as a shunt element and a rectifier has been described, the operation of the controlled rectifier 20 just as a rectifier will now be described. If the chip card is not in the immediate vicinity of the reader 1, the voltage induced in the chip card is low. If the voltage which is available in the data transmission unit, e.g. the supply voltage RFVDD, is below a prescribable value, then a shunt function is not necessary. The total electromagnetic energy transmitted via the reader antenna 2 and chip card antenna 3 shown in FIG. 6 is required in order to supply the chip 7. The controlled rectifier 20 is used just as a rectifier for the voltage induced between RF1 and RF2. To this end, the rectifier actuation unit 21 actuates the transistors T5 and T6 such that they are not on. In the case of NMOS transistors, this is done by applying the gate voltage, for example, to ground.

Again to give a better understanding, the text below describes the flow of current at a positive and a negative induced voltage. If a positive half-cycle of the induced voltage is applied, the voltage on RF1 is higher than that on RF2. The transistor T3 connected as a diode is on, while T4 is off. The induced current flows from RF1 via T3, to the chip load connected between RFVDD and ground. From there, it is not able to flow via the channel from transistor T6 back to RF2, however, since in T6 the gate applied to ground means that there are no influential charge carriers available in the channel, i.e. T6 is off. To provide a return path for the induced current nevertheless, a parasitic effect is used in this invention.

This effect is described below for NMOS transistors. A person skilled in the art can use solutions which are equivalent thereto, such as PMOS transistors. In an NMOS transistor, highly n-doped islands for the drain and the source have been diffused into a weakly p-doped substrate. PN junctions are thus produced between source and substrate and also between drain and substrate. To avoid leakage currents via the ever present source/substrate and drain/substrate PN junctions, these are operated in the reverse direction. To this end, the p-doped substrate of an n-channel transistor is applied to the lowest voltage level of the circuit, namely to ground. The interconnection and actuation by the rectifier actuation unit 21 mean that the gate and source of T6 are connected to ground. The PN junction of the n-doped source and the p-doped substrate does not conduct, since the source and the substrate are both connected to ground. The PN junction of the n-doped drain and the p-doped substrate does conduct, however, since the drain is connected to the negative voltage RF2. This parasitic substrate/drain junction in T6 means that it is possible to route the current coming from the chip load back to RF2 from the ground via the substrate, which is likewise at ground. This normally unwanted parasitic effect is used specifically for current routing in this case. Since small induced voltages also cause only small currents to flow, this parasitic leakage current is sufficient to supply the chip 7 with current. A fundamental element of the invention in the case of the controlled rectifier 20 is the identification and utilization of the parasitic effect. Without this, the circuit can be closed only using additional components, which again require chip area, however.

When a negative half-cycle of the induced voltage is applied, the voltage on RF2 is higher than that on RF1. The transistor T4 connected as a diode is on, while T3 is off. The induced current flows from RF2 via T4, to the chip load connected between RFVDD and ground. From there, it is not able to flow back to RF1 via the channel of transistor T5, however, since in T5 the gate applied to ground means that there are no influential charge carriers available in the channel, i.e. T5 is off. In this case, the parasitic effect thigh also underlies positive half-cycles is used again. The gate, the drain and the substrate of T5 are connected to ground. This means that in an NMOS transistor the PN junction of the n-doped drain and the p-doped substrate does not conduct, since both are connected to ground. The PN junction of the n-doped source and the p-doped substrate does conduct, however, since the n-doped source is connected to the negative voltage RF1. This parasitic substrate/source junction of T5 means that it is possible to route the current coming from the chip load back to RF1 from the ground via the substrate, which is likewise at ground.

By way of example and to explain the operation of the controlled rectifier 20, it has been assumed, as a simplification, that the rectifier actuation unit 21 actuates the gate connections of T5 and T6 such that the transistors are either fully on or fully off. However, it goes without saying that the rectifier actuation unit 21 can also supply the gate connections of transistors T5 and T6 with any voltage. This allows the changes between the transistors T5 and T6 being on and off to be fluid by changing the drain/source resistances. The controlled rectifier 20 can therefore also be used to regulate the supply voltage RFVDD by actuating the transistors T5 and T6 as appropriate on the basis of the supply voltage RFVDD. In this case, the operation of the controlled rectifier 20 changes, depending on the level of the induced voltage and of the power consumption of the chip 7, between just rectifier and between rectifier and shunt element simultaneously. Depending on the rectifier actuation unit 21, current is discharged through the transistors T5 and T6 once more and once less.

Figure 8:
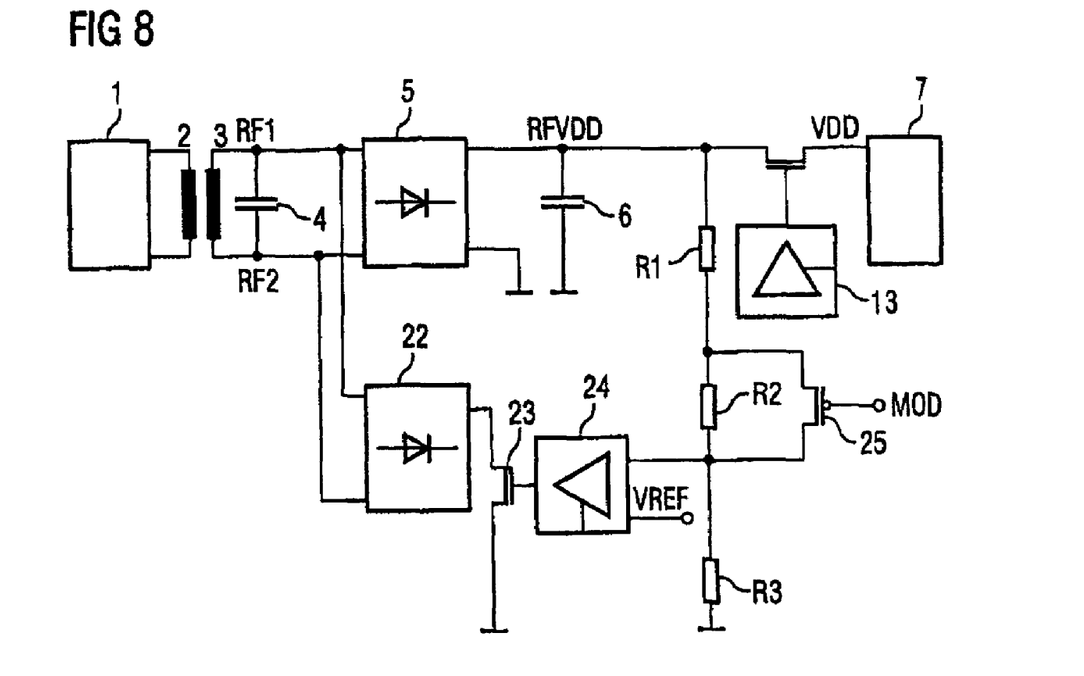
FIG. 8 shows an exemplary embodiment of an inventive regulator for the load modulation with a known shunt element.

FIG. 8 shows a refinement of the invention in which the load modulation is regulated Besides the prior art known from FIG. 1, the arrangement comprises an additional modulation rectifier 22, whose output has a modulation element 23 connected to it. The modulation element 23 is generally a transistor and is controlled by a modulation regulating amplifier 24 on the basis of a reference voltage VREF and the voltage drop across the resistor R3. R3 is part of a voltage divider which comprises the three resistors R1, R2 and R3 and which is connected between ground and RFVDD. The resistor R2 can be shorted via a further modulation element 25. The modulation element 25 may again be a transistor and is actuated by the modulation signal MOD. The arrangement comprising modulation rectifier 22, modulation element 23, modulation regulating amplifier 24 and voltage divider forms a control loop together with the rest of the circuit. In this case, regulation takes place such that the voltage drop across the resistor R3 is the same as the reference voltage VREF. This prevents the modulation operation from causing the supply voltage VDD for the chip 7 to fall below the minimum required value, and prevents the chip 7 from no longer being supplied sufficiently with current. This avoids breaks in power and thus also allows smaller smoothing capacitances 6 to be used.

To transmit data from the chip card to the reader 1 using load modulation, the data to be transmitted are coded and are applied as a modulation signal MOD to the gate of the modulation element 25. If MOD corresponds to a high level, the modulation element 25 is off and the resistor R2 is not shorted. The voltage RFVDD is regulated to the value RFVDDH=VREF*(1+(R1+R2)/R3) via the control loop. If the modulation signal MOD is at a low level, the modulation element 25 is on and shorts the resistor R2. In this case, the voltage RFVDD is regulated to the value RFVDDL=VREF*(1+R1/R3). In the case of load modulation the voltage RFVDD is therefore regulated to two different target values on the basis of the modulation signal MOD. Since the voltage on the chip card antenna 3 is coupled to the voltage RFVDD, the latter is also regulated. The depth of modulation is obtained from the ratio of the amplitudes at high and low levels of the modulation signal MOD and is RFVDDH/RFVDDL=1+R2/(R1+R3). The depth of modulation is thus constant, regardless of voltages, and can be set using the values of the resistors R1, R2 and R3.

Figure 9:
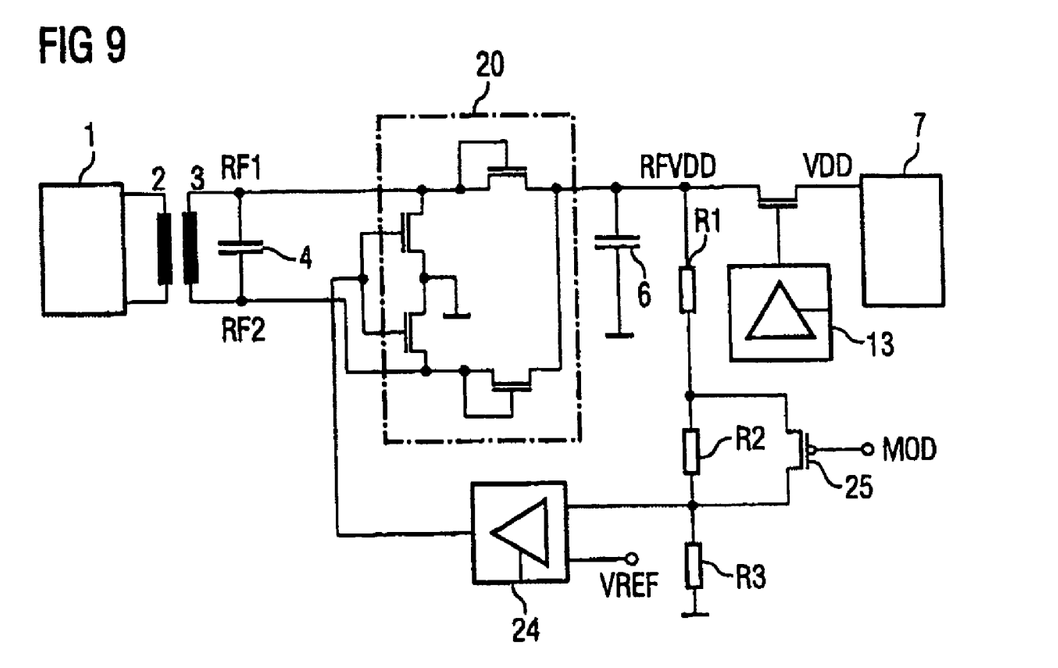
FIG. 9 shows an exemplary embodiment of an inventive regulator for the load modulation with a controlled full-wave bridge rectifier.

FIG. 9 shows an advantageous development of the circuit with load modulation regulation which is shown in FIG. 8. The operation of the modulation rectifier 22 and the modulation element 23 in FIG. 8 is undertaken by the controlled rectifier 20. There is thus no need for the modulation rectifier 22 and the modulation element 23 from FIG. 8. Given the same functionality, the number of components and hence also the chip area which is required for the data transmission unit are reduced. All the advantages of the regulation of the load modulation from FIG. 8 are retained. In the case of the solution shown in FIG. 9, it is fundamental that the controlled rectifier 20 simultaneously performs the three functions of rectifier, shunt element and modulation element.

In contrast to the prior art, where each function is performed by dedicated transistors, only the transistors of the controlled rectifier 20 are required in the case of this invention. The otherwise necessary shunt transistor with shunt rectifier and the modulation rectifier with modulation element can be dispensed with. Given the same functionality, the circuit is simplified considerably and the required chip area is reduced to a minimum.

The above description of the exemplary embodiments in line with the present invention is used only for illustrative purposes and not in order to limit the invention. The invention permits various changes and modifications without departing from the scope of the invention or its equivalents.

The invention claimed is:

1. A data transmission unit comprising:
a data transmission interface having a controlled rectifier, wherein the controlled rectifier comprises first, second, third, and fourth transistors which are arranged in the form of a full-wave bridge rectifier, wherein the first and second transistors are arranged to operate as diodes, and the third and fourth transistors are arranged to be actuated by a rectifier actuation unit.

2. The data transmission unit of claim 1, wherein the controlled rectifier is actuated on the basis of a voltage which is available in the data transmission unit.

3. The data transmission unit of claim 1, wherein the data transmission interface is of a contactless design.

4. The data transmission unit of claim 1, wherein
upon a voltage which is available in the data transmission unit exceeding a predetermined value, the third and fourth transistors being actuated, whereby current flows through the first transistor and through the third and fourth transistors for a positive half-cycle of the input voltage on the controlled rectifier and flows through the second transistor and through the third and fourth transistors for a negative half-cycle, and wherein
upon a voltage which is available in the data transmission unit falling below the predetermined value, the third and fourth transistors being actuated, whereby current flows through the first transistor and through the fourth transistor for a positive half-cycle of the input voltage on the controlled rectifier and flows through the second transistor and through the third transistor for a negative half-cycle.

5. The data transmission unit of claim 4, wherein the third and fourth transistors are actuated on the basis of a voltage present at the output of the controlled rectifier.

6. The data transmission unit of claim 1, wherein the first, second, third and fourth transistors are designed using NMOS technology.

7. The data transmission unit of claim 1, wherein the third and fourth transistors are actuated on the basis of the data to be transmitted by a data interface.

8. The data transmission unit of claim 7, wherein the ratio of the voltages which are present on the controlled rectifier, in the case of the high and low states for the data to be transmitted, is independent of the voltage which is present on the output of the controlled rectifier.

9. The data transmission unit of claim 7, wherein the ratio of the voltages which are present on the controlled rectifier, in the case of the high and low states, for the data which are to be transmitted is predetermined.

10. A method for operating the data transmission unit of claim 1, wherein the controlled rectifier performs one or more of the operations selected from the group consisting of rectifier, shunt element and modulation elements.

11. A method for regulating the output voltage at an output line of a circuit, the circuit comprising an antenna, a rectifier bridge circuit with first, second, third and fourth transistors which are arranged in the form of a full-wave bridge rectifier, and the third and fourth transistors are arranged to operate as diodes, and an actuation unit, the method comprising:
receiving electromagnetic energy at the antenna;
inducing a voltage between first and second points coupled to opposite ends of the antenna; and
actuating the first and second transistors of the rectifier bridge circuit,
wherein the actuation unit performs the actuating step.

12. The method of claim 11, wherein the rectifier bridge circuit is disposed between the antenna and the output line.

13. The method of claim 11, wherein the first and second transistors are actuated simultaneously.

14. A method for changing the value of an output voltage line of a combination electromagnetic/rectifier bridge circuit, the rectifier bridge circuit comprising a plurality of transistors, and an actuation unit being connected to one or more of the transistors, the method comprising:
inducing a voltage at the antenna; and
actuating current flow by the action of an actuating unit in one or more of the plurality of transistors of the rectifier bridge circuit if a present value of the output voltage line exceeds a predetermined value.

15. The method of claim 14, wherein the inducing step produces a voltage imbalance and, wherein the imbalance causes the activation of one of the plurality of transistors different from the one or more of the plurality of transistors actuated in the actuating step.

16. The method of claim 14, wherein the plurality of transistors are NMOS transistors.

* * * * *